United States Patent
Pötzsch et al.

(10) Patent No.: US 6,466,695 B1
(45) Date of Patent: Oct. 15, 2002

(54) PROCEDURE FOR AUTOMATIC ANALYSIS OF IMAGES AND IMAGE SEQUENCES BASED ON TWO-DIMENSIONAL SHAPE PRIMITIVES

(75) Inventors: Michael Pötzsch, Bochum; Norbert Krüger, Kiel, both of (DE); Christoph von der Malsburg, Santa Monica, CA (US)

(73) Assignee: Eyematic Interfaces, Inc., Inglewood, CA (US)

( * ) Notice: Subject to any disclaimer, the term of this patent is extended or adjusted under 35 U.S.C. 154(b) by 0 days.

(21) Appl. No.: 09/366,948

(22) Filed: Aug. 4, 1999

(51) Int. Cl.[7] .............................. G06K 9/40; G06K 9/46; G06K 9/48; H04N 5/208; H04N 1/40
(52) U.S. Cl. ...................... 382/199; 382/190; 382/195; 382/205; 382/260; 382/264; 382/266; 382/269; 382/272; 348/252; 358/447
(58) Field of Search ................................ 382/103, 115, 382/118, 155, 157, 159, 173, 181, 190, 195, 199, 203–205, 209–210, 215, 254, 258, 261–266, 269–270, 273, 275, 279, 272, 276; 348/252; 358/447, 461, 463; 704/232, 234

(56) References Cited

U.S. PATENT DOCUMENTS

| | | | |
|---|---|---|---|
| 4,725,824 A | 2/1988 | Yoshioka | 340/575 |
| 4,805,224 A | 2/1989 | Koezuka et al. | 382/8 |
| 4,827,413 A | 5/1989 | Baldwin et al. | 364/413.19 |
| 5,168,529 A | 12/1992 | Peregrim et al. | 382/48 |
| 5,187,574 A | 2/1993 | Kosemura et al. | 358/108 |
| 5,220,441 A | 6/1993 | Gerstenberger | 358/487 |
| 5,333,165 A | 7/1994 | Sun | 378/10 |
| 5,383,013 A | 1/1995 | Cox | 356/2 |
| 5,430,809 A | 7/1995 | Tomitaka | 382/173 |
| 5,432,712 A | 7/1995 | Chan | 364/514 |
| 5,511,153 A | 4/1996 | Azarbayejani et al. | 395/119 |
| 5,533,177 A | 7/1996 | Wirtz et al. | 395/119 |
| 5,588,033 A | 12/1996 | Yeung | 378/4 |
| 5,680,487 A | 10/1997 | Markandey | 382/291 |
| 5,699,449 A | 12/1997 | Javidi | 382/156 |
| 5,714,997 A | 2/1998 | Anderson | 348/39 |
| 5,715,325 A | 2/1998 | Bang et al. | 382/118 |
| 5,719,954 A | 2/1998 | Onda | 382/154 |
| 5,736,982 A | 4/1998 | Suzuki et al. | 345/330 |
| 5,764,803 A | 6/1998 | Jacquin et al. | 382/236 |
| 5,774,591 A | 6/1998 | Black et al. | 382/236 |
| 5,809,171 A | 9/1998 | Neff et al. | 382/209 |
| 5,828,769 A | 10/1998 | Burns | 382/118 |
| 6,222,939 B1 * | 4/2001 | Wiskott et al. | 382/209 |

FOREIGN PATENT DOCUMENTS

DE 44 06 020 C1 6/1995 ............ G06K/9/62

OTHER PUBLICATIONS

Chibelushi, et al."Robustness of Head Pose Estimation based on Gabor Wavelets and Graph Matching", IEEE, Jul. 15, 1999, 38–41.*

Kruger, et al. "Object Recognition with Banana Wavelets", IEEE, 1997, pp. 1–7.*

(List continued on next page.)

Primary Examiner—Leo Boudreau
Assistant Examiner—Daniel G. Mariam
(74) Attorney, Agent, or Firm—Gray Cary Ware & Freidenrich

(57) ABSTRACT

The invention provides an apparatus, and related method, for providing a procedure to analyze images based on two-dimensional shape primitives. In the procedure, an object representation is created automatically from an image and then this representation is applied to another image for the purpose of object recognition. The features used for the representation are the two type of two-dimensional shape primitives: local line segments and vertices. Furthermore, the creation of object representations is extended to sequences of images, which is especially needed for complex scenes in which, for example, the object is presented in front of a structured background.

4 Claims, 9 Drawing Sheets-

OTHER PUBLICATIONS

Kefalea "Object Localization and Recognition for a Grasping Robot", IEEE, Aug. 31, 1998, pp. 2057–2062.*

Akimoto, T., et al, "Automatic Creation of 3–D Facial Models", *IEEE Computer Graphics & Applications.*, pp. 16–22, Sep. 1993.

Ayache, N., et al, "Rectification of Images for Binocular and Trinocular Stereovision", In *IEEE Proceedings of 9th International Conference on Pattern Recognition*, pp. 11–16, 1988, Italy.

Belhumeur, P., "A Bayesian Approach to Binocular Stereopsis", *International Journal of Computer Vision*, 19 (3), 1996, pp. 237–260.

Beymer, D. J., "Face Recognition Under Varying Pose", *Massachusettes Institute of Technology, Artificial Intelligence Laboratory*, A.I. Memo No. 1461, Dec. 1993, pp. 1–13.

Beymer, D. J., "Face Recognition Under Varying Pose", *Massachusettes Institute of Technology, Artificial Intelligence Laboratory research report*, 1994, pp. 756–761.

Buhmann, J. et al, "Distortion Invariant Object Recognition by Matching Hierarchically Labeled Graphs", In *Proceedings IJCNN International Conference of Neural Networks*, Wash., DC, Jun. 1989, pp. 155–159.

DeCarlo, D., et al, "The Integration of Optical Flow and Deformable Models with Applications to Human Face Shape and Motion Estimation", pp. 1–15, In *Proceedings, CVPR '96*, pp. 231–238.

Devernay, F., et al, "Computing Differential Properties of 3–D Shapes from Stereoscopic Images without 3–D Models", *INRIA*, RR–2304, 1994, pp. 1–28.

Dhond, U., et al, "Structure from Stereo–A Review", *IEEE Transactions on Systems, Man, and Cybernetics*, vol. 19, No. 6, pp. 1489–1510, Nov./Dec. 1989.

Fleet, D. J., et al, "Computation of Component Image Velocity from Local Phase Information", *International Journal of Computer Vision*, vol. 5, No. 1, 1990, pp. 77–104.

Fleet, D.J., et al, "Measurement of Image Velocity", *Kluwer International Series in Engineering and Computer Science*, Kluwer Academic Publishers, Boston, 1992, No. 169, pp. 1–203.

Hall, E. L., "Computer Image Processing and Recognition", Academic Press, 1979, pp. 468–484.

Hong, H., et al, "Online Facial Recognition Based on Personalized Gallery", *Proceedings of International Conference on Automatic Face and Gesture Recognition*, pp. 1–6, Japan, Apr. 1997.

Kolocsai, P., et al, Statistical Analysis of Gabor–Filter Representation, *Proceedings of International Conference on Automatic Face and Gesture Recognition*, 1997, 4 pp.

Kruger, N., "Visual Learning with a priori Constraints", *Shaker Verlag*, Aachen, Germany, 1998, pp. 1–131.

Kruger, N., et al, "Principles of Cortical Processing Applied to and Motivated by Artificial Object Recognition", Institut fur Neuroinformatik, *Internal Report 97–17*, Oct. 1997, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinformatik, Dec. 1996, pp. 1–24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimination Functions Using a priori Constraints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1–46.

Manjunath, B. S., et al, "A Feature Based Approach to Face Recognition", *In Proceedings IEEE Conference on Computer Vision and Pattern Recognition*, pp. 373–378, Mar. 1992.

Mauer, T., et al, "Single–View Based Recognition of Faces Rotated in Depth", In *Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", In *Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (publication & date unknown), 6 pp.

Okada, K., et al, "The Bochum/USC Face Recognition System", 19 pp. (publication & date unknown).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F, et al, "Synthesizing Realistic Facial Expressions from Photographs", In *SIGGRAPH 98 Conference Proceedings*, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W. M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al, "Face Recognition by Elastic Bunch Graph Matching", *Internal Report, IR–INI 96–08*, Institut fur Neuroinformatik, Ruhr–Universitat, Bochum, pp. 1–21, Apr. 1996.

Wiskott, L., "Labeled Graphs and Dynamic Link Matching for Face Recognition and Sceene Analysis", *Verlag Harri Deutsch*, Thun–Frnakfurt am Main. Reihe Physik, Dec. 1995, pp. 1–109.

Wiskott, L., "Phanton Faces for Face Analysis". *Proceedings of 3rd Joint Symposium on Neural Computation*, Pasedena, CA, vol. 6, pp. 46–52, Jun. 1996.

Wiskott, L., "Phanton Faces for Face Analysis". *Internal Report, IR–INI 96–06*, Institut fur Neoroinformatik, Ruhr–Universitat, Bochum, Germany, Apr. 1996, 12 pp.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transacitons on Image Processing*, vol. 4, No. 10, Oct., 1995, pp. 1382–1394.

Written Opinion for PCT/US99/28297.

Kruger et al, "ORASSYLL: Object Recognition With Autonomously Learned And Sparse Symbolic Representations Based On Local Line Detectors", XP–000908858.

International Search Report for PCT/US99/28297.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision, ICCV '98*, pp. 811–817, Bombay, Jan. 1998.

Wiskott, L. "Phantom Faces for Face Analysis", *Pattern Recognition*, vol. 30, No. 6, pp. 837–846, 1997.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.

\* cited by examiner a)  b)  c)

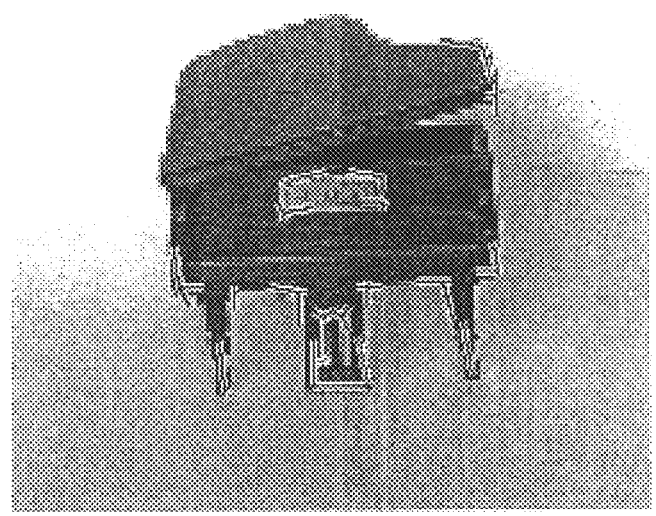
Figure 12c
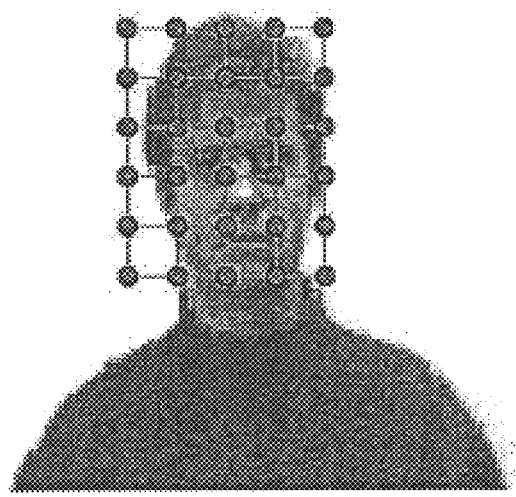 
Figure 13a    Figure 13b

PROCEDURE FOR AUTOMATIC ANALYSIS OF IMAGES AND IMAGE SEQUENCES BASED ON TWO-DIMENSIONAL SHAPE PRIMITIVES

BACKGROUND OF THE INVENTION

The present invention relates to automatic image analysis, and more particularly, to automatic object recognition in images and image sequences based on two-dimensional shape primatives. The invention is advantageous for image analysis and object recognition for complex scenes in which an object is presented in front of a structured background.

Typical automatic manufacturing controls and especially robot arm controls generally fail to provide adequate automatic adaptation to new materials introduced into an industrial process. Generally, any details and possible situations of the process must be regarded and implemented beforehand. To overcome such a precise constructions and to overcome the restriction to the number of materials for which the process has been constructed, materials—or more generally speaking, objects—must be treated in a sophisticated way. Accordingly, the representations of new objects must be created automatically so that they can be recognized at any place in the manufacturing process. Such an automation may also improve other kinds of applications, such as e.g. the automatic organization of a warehouse.

Existing algorithms (see, e.g., Martin Lades, Jan C. Vorbrüggen, Joachim Buhmann, Jörg Lange, Christoph v.d. Malsburg, Rolf P. Würtz, and Wolfgang Konen, "Distortion invariant object recognition in the dynamic link architecture", IEEE Trans. Comput., 42(3):300 311, 1993, and Laurenz Wiskott, Jean-Marc Fellous, Norbert Krüiger, and Christoph von der Malsburg, "Face recognition by elastic bunch graph matching", IEEE-PA MI, 19(7):775–779, 1997) allow for automatic recognition of objects but have the following two drawbacks: first, such algorithms work most properly for objects containing much texture but less well for manmade objects, because these kind of objects mainly consist of edges and need a good description of their contour in most cases. Second, the representation is not created automatically, i.e., the locations within an image which shall be used for the representation have to be defined by hand.

Accordingly, there exists a definite need for automatic image analysis techniques that can automatically generate representations for new objects for recognition in a variety of industrial manufacturing processes and environments. The present invention satisfies these needs and provides further related advantages.

SUMMARY OF THE INVENTION

The invention provides an apparatus, and related method, for providing a procedure to analyze images based on two-dimensional shape primitives. In the procedure, an object representation is created automatically from an image and then this representation is applied to another image for the purpose of object recognition. The features used for the representation are the two types of two-dimensional shape primitives: local line segments and vertices. Furthermore, the creation of object representations is extended to sequences of images, which is especially needed for complex scenes in which, for example, the object is presented in front of a structured background.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 5a is an image of a banana wavelet.

FIG. 5b is an image showing a path corresponding to the wavelet of FIG. 5a.

FIG. 5c is an image showing a visualization of a representation of an object class based on banana wavelets, according to the present invention.

FIG. 12c is an image showing vertex detection and identification for a piano.

FIG. 13a is an image showing creation of an object representation using a graph in the form of a rectangular grid restricted to a certain region of the image.

FIG. 13b is an image showing line segments for visualizing the line segments associated with the node of the graph of FIG. 13a.

DETAILED DESCRIPTION OF THE PREFERRED EMBODIMENTS

Figure 1:
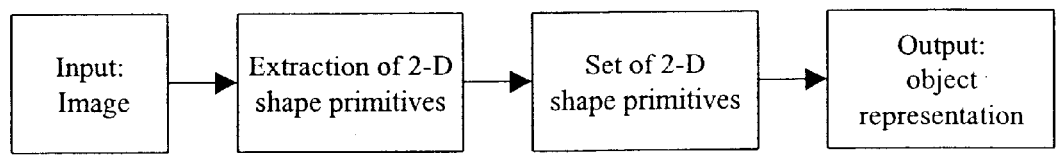
FIG. 1 is a flow chart of a process for creation of an object representation by one-shot learning, according to the present invention.

The invention relates to the automatic creation of an object representation in accordance with the process shown in FIG. 1. A greylevel image (or the intensity image computed from a color image) is taken as input. From this image, a feature type two dimensional shape primitive is extracted. Two peculiarities of this feature type may include local line segments and vertices. Local line segments are straight or curved lines of small extent; vertices are junctions of line segments. Vertices can be corners (symbolized by the character L) or more complex ones which have a shape similar to the characters T, Y, X, or K, or consist of even more edges which 'meet' at a certain location. The feature extraction leads to a set of two-dimensional shape primitives, containing location and parameters of the feature (e.g., direction of the line) for every two-dimensional shape primitive. As only those features which appear saliently in the image are part of the set, the set as such is a representation of the object presented in the image. In a further step, the object is represented in a more sophisticated manner by the help of an undirected graph. The nodes of the graph are labeled with the detected features and the edges of the graph are labeled with the distance vectors between the features. Since the object representation is created from a single image, it is referred to as one-shot learning in the following.

Figure 2:
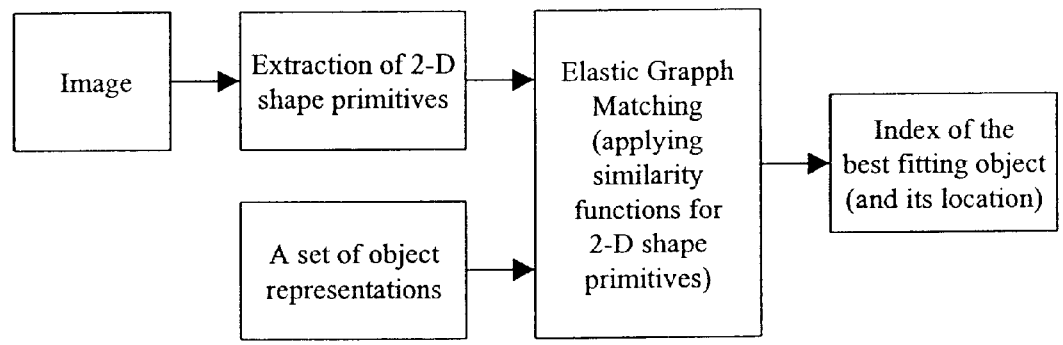
FIG. 2 is a flow chart of a process for recognition of an object represented by two-dimensional shape primitives using elastic graph matching, according to the present invention.
Figure 3:
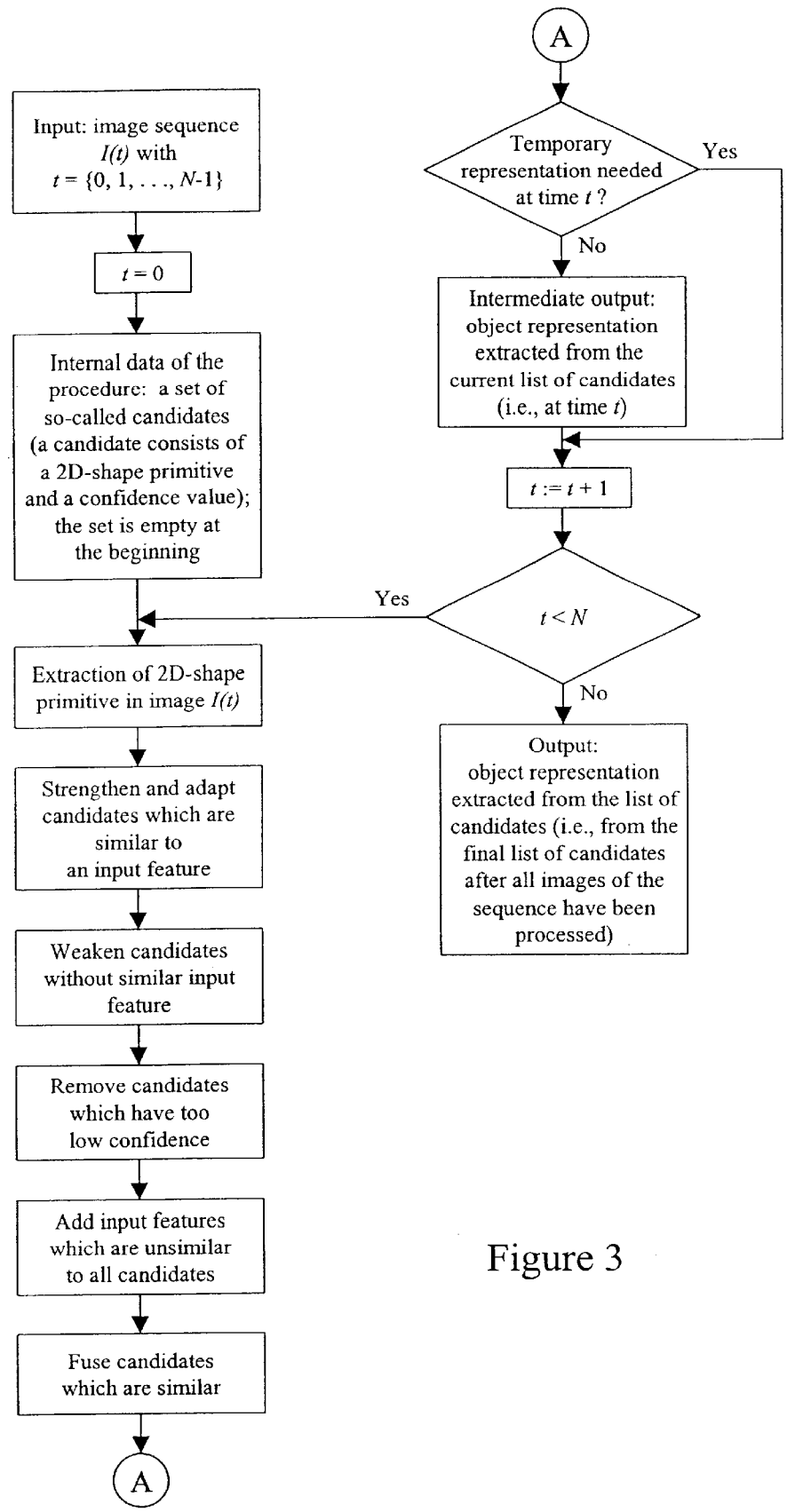
FIG. 3 is a flow chart of a process for creation of an object representation by iterative learning, according to the present invention.

After the object representation has been created automatically, it can be applied to be recognized in another image by the algorithm Elastic Graph Matching (EGM) described in Laurenz Wiskott, Jean-Marc Fellous, Norbert Krüger, and Christoph von der Malsburg, "Face recognition by elastic bunch graph matching", *IEEE-PA MI*, 19(7):775–779, 1997; and Martin Lades, Jan C. Vorbrüggen, Joachim Buhmann, Jörg Lange, Christoph v.d. Malsburg, Rolf P. Würtz, and Wolfgang Konen, "Distortion invariant object recognition in the dynamic link architecture", *IEEE Trans. Comput.*, 42(3):300 311, 1993 (see FIG. 2). This algorithm is based on the computation of the similarity between a feature given at a node of a graph and a feature extracted at some location in the image. Therefore such similarity functions are defined for both local line segments and vertices in this invention. The result of EGM is the location of the object in the image and furthermore the locations of the nodes of the graph. If not only one but a set of object representations is given EGM computes which object fits best to the object given in the image. The process according to the invention also contains an improvement on one-shot learning. In the case that the object is presented in a complex scene (e.g., in front of a structured background or/and illuminated by a spotlight, etc.), the object representation created by one-shot learning will contain 'unwanted' features (e.g., features referring to the background or/and the shades of the illumination). In such a case the object representation can be learning from a sequence of images in which the object remains unchanged but the scene (e.g., background or/and illumination) changes (see FIG. 3). This so-called iterative learning detects reliable features of the object.

This section describes how the two peculiarities local line segment and vertex of the feature type two-dimensional shape primitive are extracted from a gray-level image (or the intensity image computed from a color image).

Figure 4:
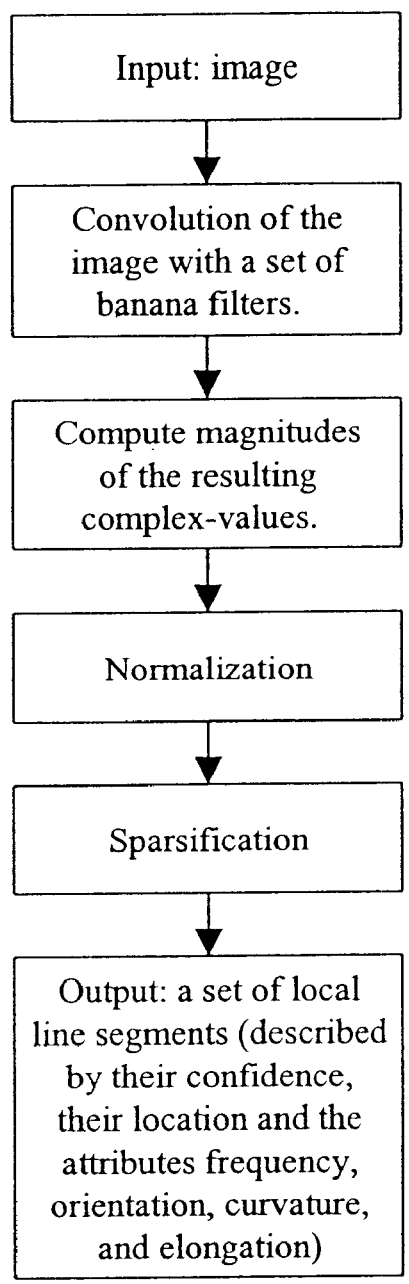
FIG. 4 is a flow chart of a process for extraction of local line segments from an image, according to the present invention.

The extraction of local line segments consists of following three steps (see FIG. 4): First, the given image is convolved with a set of generalized Gabor filters called banana filters. The magnitudes of these complex-valued responses are taken as input for the next step. There exists a vector of resulting values at every pixel position, one coefficient for every filter of the set of filters. Second, the resulting values are normalized. Third, the normalized values are sparsified by, roughly speaking, computing local maxima. Since these local maxima are the output of this step, the output only contains values at some and not at all pixel locations. Thus, the output is a set of local line segments described by their confidence, their location and the attributes frequency, orientation, curvature, and elongation. After two definitions the algorithm is explained in detail in the following:

The basic features of the object recognition system are Gabor wavelets or a generalization of Gabor wavelets, called banana wavelets. A banana wavelet $B^{\vec{b}}$ is a complex valued function defined on $\mathbb{R} \times \mathbb{R}$. It is parameterized by a vector $\vec{b}$ of four variables $\vec{b} = (f, \alpha, c, s)$ expressing the attributes frequency ($f$), orientation ($\alpha$), curvature ($c$) and elongation ($s$) (see FIG. 5a for an example):

$$B^{\vec{b}}(x,y) = \gamma^{\vec{b}} \cdot G^{\vec{b}}(x,y) \cdot (F^{\vec{b}}(x,y) - DC^{\vec{b}}) \tag{1}$$

with the constant $DC^{\vec{b}}$ which ensures that the wavelet $B^{\vec{b}}$ has a vanishing 0-th Fourier component and $$G^{\vec{b}}(x,y) = \exp(-f^2/2(\sigma_x^{-2}(x\cos\alpha + y\sin\alpha + c(-x\sin\alpha + y\cos\alpha)^2)^2 \sigma_y^{-2} s^{-2}((-x\sin\alpha + y\cos\alpha)^2))$$

and $$F^{\vec{b}}(x,y) = \exp(if(x\cos\alpha + y\sin\alpha + c(-x\sin\alpha + y\cos\alpha)^2)) \tag{2}$$

with $i = \sqrt{-1}$.

Figure 5:
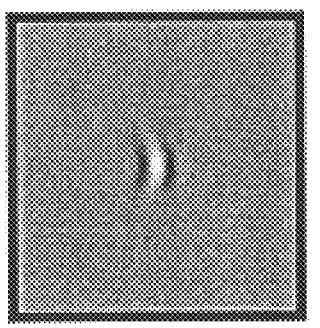
Figure 5:
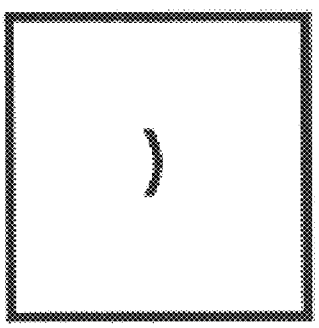
Figure 5:

To each banana wavelet $B^{\vec{b}}$ there can be defined a curve or path $\vec{p}^{\vec{b}}$, called the curve corresponding to $B^{\vec{b}}$ (see FIG. 5b). This curve allows the visualization of the learned representation of an object (see FIG. 5c).

Formally $\vec{p}^{\vec{b}}(t)$ is defined as:

$$\vec{p}^{\vec{b}}(t) = \begin{pmatrix} p_x^{\vec{b}}(t) \\ p_y^{\vec{b}}(t) \end{pmatrix}$$

$$= \begin{pmatrix} \cos(2\pi - a)\left(-\frac{c}{f}(s\sigma_y t)^2\right) + \sin(2\pi - a)\left(\frac{1}{f}s\sigma_y t\right) \\ -\sin(2\pi - a)\left(-\frac{c}{f}(s\sigma_y t)^2\right) + \cos(2\pi - a)\left(\frac{1}{f}s\sigma_y t\right) \end{pmatrix}$$

with $t \in [-1, 1]$ and its length $L(\vec{p}^{\vec{b}})$ as $$L(\vec{p}^{\vec{b}}) := \sqrt{\int_{-1}^{1}\left(\frac{\partial p_x^{\vec{b}}(t)}{\partial t}\right)^2 + \left(\frac{\partial p_y^{\vec{b}}(t)}{\partial t}\right)^2 dt}. \tag{3}$$

Figure 6:
FIG. 6 is an image of a person's face.
Figure 7:
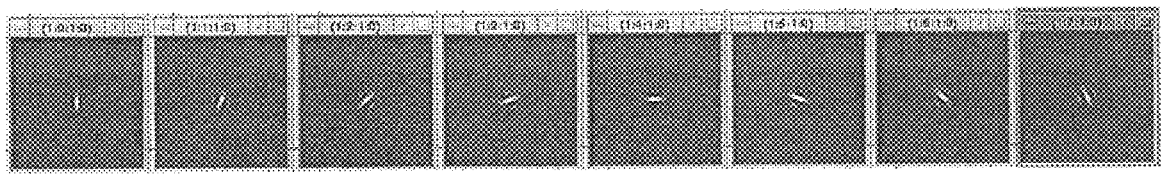
FIG. 7 shows eight images of the real part of kernels for filtering images with banana wavelets, according to the present invention.
Figure 8:
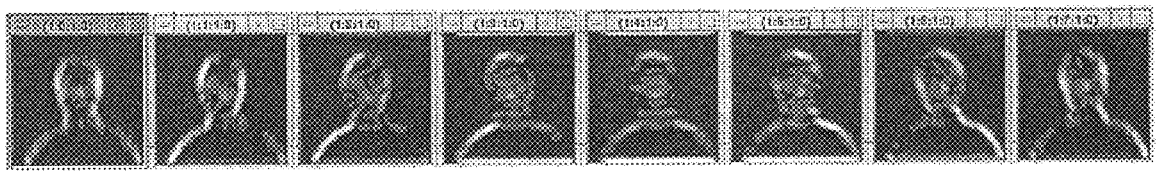
FIG. 8 shows eight images of the magnitude of filter responses for the eight filters of FIG. 7, respectively, applied to the image of FIG. 6, according to the present invention.

A non-linear transformations in feature space is now described. The magnitudes of the (complex-valued) filter responses for the chosen set of banana filters at every pixel position of the given image is computed by $$r(\vec{c}) = (AI)(\vec{x}_0, \vec{b}) = |\int B^{\vec{b}}(\vec{x}_0 - \vec{x}) I(\vec{x}) d\vec{x}| = |(B^{\vec{b}} * I) \cdot (\vec{x}_0)|$$

with the magnitude of the filter response $B^{\vec{b}}$ at pixel position $\vec{x}_0$ in image I (or, in other words, the filter response corresponding to $\vec{c} = (\vec{x}_0, \vec{b})$). A filter $B^{\vec{b}}$ causes a strong response at pixel position $\vec{x}_0$ when the local structure of the image at that pixel position is similar to $B^{\vec{b}}$. FIG. 8 shows the magnitude of the responses of the banana filters in FIG. 7 applied to the image in FIG. 6.

Figure 9:
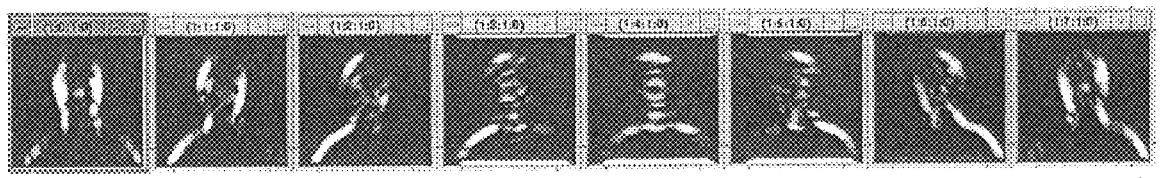
FIG. 9 shows eight images of normalized transformations of the eight filter response images of FIG. 8.
Figure 10:
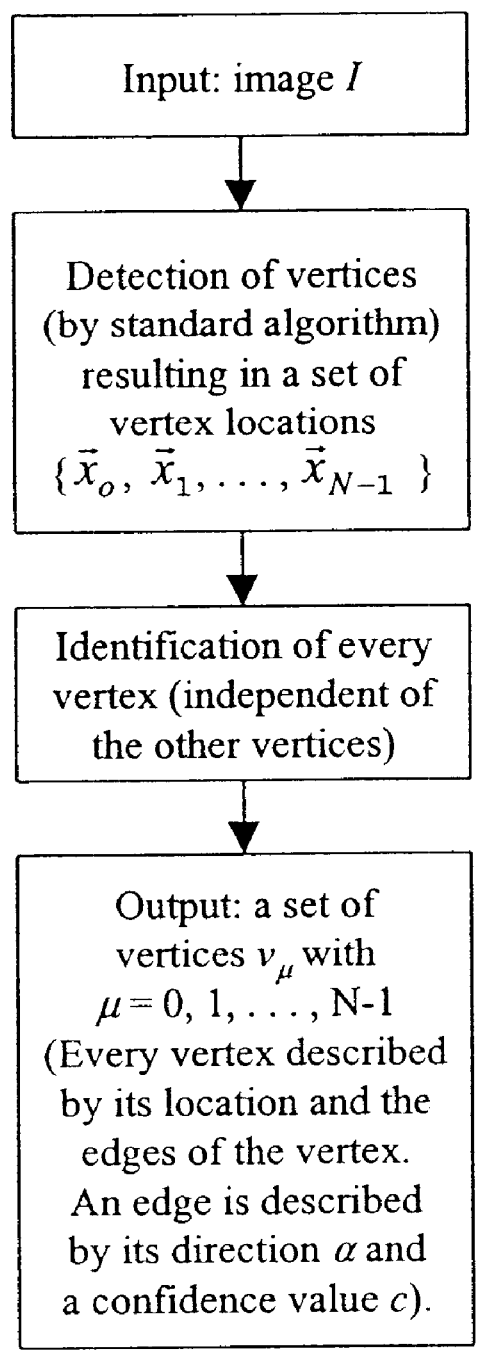
FIG. 10 is a flow chart of a process for extraction of vertices from an image, according to the present invention.
Figure 11:
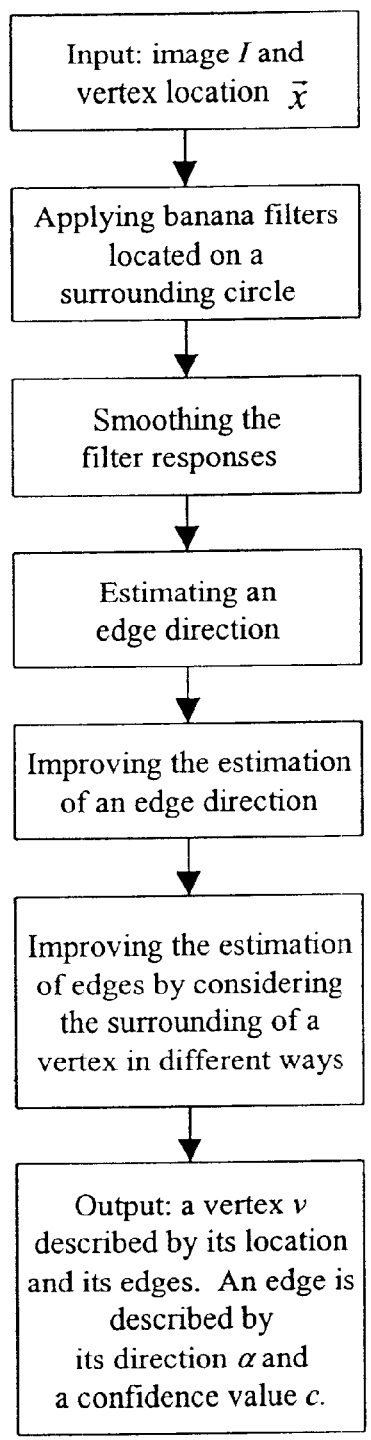
FIG. 11 is a flow chart of a process for identification of a vertex in an image, according to the present invention.

The magnitude of the filter responses depends significantly on the strength of edges in the image. However, here we are only interested in the presence and not in the strength of edges. Thus, in a second step a function $f_{norm}(\ldots)$ normalizes the real valued filter responses $r(\vec{c})$ into the interval $[0, 1]$ (FIG. 9 shows the normalized transformation). The value $f_{norm}(\vec{c})$ represents the likelihood of the presence or absence of a local line segment corresponding to $\vec{c} = (\vec{x}_0, \vec{b})$. This normalization is based on the "Above Average Criterion" AAC: a line segment corresponding to the banana wavelet c is present if the corresponding banana wavelet response is distinctly above the average response.

More formally, an average response is defined by considering the average response in the complete feature space and also in a local area of the feature space. Therefore, a global and a local normalization are performed.

A mean total response is defined as $E^{local}(\vec{x}_0, f_0, I)$ for the $f_0$-th level at pixel position $\vec{x}_0$ and the mean total response for the $f_0$-th level $E^{total}(f_0)$ of the banana space by $$E^{local}(\vec{x}_0, f_0, I) := \langle r(\vec{x}, \vec{b}) \rangle_{\{\vec{x} \in I, \vec{b} \in B, I = f_0\}}$$

and $$E^{total}(f_0) := \langle r(\vec{x}, \vec{b}) \rangle_{\{\vec{x} \in I, \vec{b} \in B, I = f_0\}}$$

where $A(\vec{x}_0, r_E)$ represents the cuboid square with center $\vec{x}_0$ and edge length $r_E$ in the (x, y) space. I represents a set of arbitrary natural images and B is the full set of discrete banana wavelets at one pixel position. The average response $E(I, \vec{x}_0)$ is defined as $$E(\vec{x}_0, f_0, I) := \frac{E^{total}(f_0) + E^{local}(\vec{x}_0, f_0, I)}{2}.$$

The function $E(\vec{x}_0, f_0, I)$ has high values when there is structure in the local area around $\vec{x}_0$.

The sigmoid function $$f_{norm}(r, \vec{x}_0, f_0) = f_{norm}(r, \vec{x}_0, f_0, I) = \tag{4}$$

$$\frac{1}{2}\left(\left(\tanh\left(\frac{1}{\theta_2 E(\vec{x}_0, f_0, I)}\left(1 - \frac{\theta_1 + \theta_2}{\theta_1 - \theta_2}\right) \cdot t + \frac{\theta_1 + \theta_2}{\theta_1 - \theta_2}\right) + 1\right)\right)$$

is the final normalization function. The normalization function starts to increase for values larger than $\theta_1$ $E(I, f_0, \vec{x}_0)$ and becomes almost flat for values higher than $\theta_2$ $E(I, f_0, \vec{x}_0)$.

The value $f_{norm}$ $(r(\vec{c}))$ represents the system's confidence of the presence of the feature $\vec{b}$ at position $\vec{x}_0$. This confidence is high when the response exceeds the average activity significantly. The exact value of the response is not of interest. However, a range of indecision of the system when the response is only slightly above the average activity is still allowed to avoid a very strict decision at this stage.

In the sparsification step the transformation is reduced to a small set of filter responses with positive values, all other filter responses are set to zero. For each frequency level $f_0$ the transformed image is divided in space-orientation bins $\beta(x, y, f_0, \alpha)$. The width $w^s$ of a bin in the space-dimensions depends on the length of the path $L(\vec{p}^{\vec{b}})$ with $\vec{b} = (f_0, c(0), 0)$ and the width in the orientation domain is $w^o = 2\pi/n_0$, where $n_0$ is the number of orientation bins for fixed (x, y).

For each bin $\beta(x, y, f_0, \alpha)$ let $\vec{c}_{\beta(x, y, f_0, \alpha)}$ be the index of the filter response which is maximum within the bin and let this maximum response be given by $m_{\beta(x, y, f_0, \alpha)}$. To avoid that similar features occur within the sparsified transformation for each $\vec{c}_{\beta(x, y, f_0, \alpha)}$ the distance to the index corresponding to the maxima of n neighboring bins is checked. If $d(\vec{c}_{\beta(x, y, f_0, \alpha)}, \vec{c}_{\beta(x, y, f_0, \alpha)}) < \delta$ (the metric d is defined in eq. (79)) for a neighboring bin one of the responses corresponding to the two indices is set to zero: in case of $m_{\beta(x, y, f_0, \alpha)} > m'_{\beta(x, y, f_0, \alpha)}$ it is $m'_{\beta(x, y, f_0, \alpha)}$ set to zero, otherwise $m_{\beta(x, y, f_0, \alpha)} := 0$. All values of the sparsified transformation are set to zero except the values corresponding to the indices of found maxima. These are set to the corresponding maxima values. The sparsified values are referred to as $S(\vec{c})$.

The output of this final step of the extraction is a set U of those local line segments whose sparsified response $S(\vec{c})$ is larger than the threshold $\Theta$. $S(\vec{c})$ can be interpreted as a confidence value of the feature in question. Every local line segment $u_\mu$ of this set is represented by the coefficients of $\vec{c}$ (i.e., its location (x, y) and its attributes $\vec{b} = (f, \alpha, c, s)$ (see (L0))) and by the response $S(\vec{c})$.

$$u_\mu = (\vec{c}; S(\vec{c})). \tag{5}$$

The set is $$U = \{u_0, u_1, \ldots, u_{N-1}\} \tag{6}$$

where N is the number of elements in the set.

A typical choice of all the parameters referring to the transformation and the banana space needed for the extraction of local line segments is given in table 1.

TABLE 1

Standard Settings.

| Transformation | | Banana space | |
|---|---|---|---|
| number levels $n_l = 3$ | freq. $f = f_{max} f_s^{f_l}$ | $f_{max} = 2\pi$ | $e_x = 4$ |
| number orientations $n_o = 8$ | | $f_s = 0.8$ | $e_y = 4$ |
| number bendings $n_b = 5$ | max. curvature | $c_{max} = 1.3$ | $e_f = 0.01$ |
| number elongations $n_e = 2$ | | | $e_a = 0.3$ |
| σ x-direction $\sigma_x = 1.0$ | | | $e_c = 0.4$ |
| σ y-direction $\sigma_y = 1.0$ | | | $e_s = 3.0$ |

Columns 1, 2: Parameters of transformation.
Column 3: Metric of the feature space.

Typical values for the other parameters are $$\Theta = 0.7 \tag{7}$$

$$\theta_1 = 1.3 \tag{8}$$

$$\theta_2 = 2.7 \tag{9}$$

$$n_0 = 2. \tag{10}$$

The extraction of vertices from an image I is done in two steps, first detection and then identification. The detection is done by a standard algorithm, such as: Rolf P. Würtz and Tino Lourens. "Corner detection in color images by multi-scale combination of end-stopped cortical cells", In *Proceedings of the ICANN* 1997, 1997. (this algorithm is based on end-stopped cells), and results in a set of vertex locations $$\{\vec{x}_0, \vec{x}_1, \ldots, \vec{x}_\mu, \ldots, \vec{x}_{N-1}\} \tag{11}$$

where N is the number of detected locations. In a second step, the directions of the edges of every detected vertex are determined. In addition, a confidence value c is computed for every edge. Thus, a vertex is defined by its location $\vec{x}$ and a set of $N_{edges}^{(\mu)}$ edges. Every edge j is given by its direction $\alpha_j$ and its confidence $c_j$. Thus the $\mu$-th vertex $v_\mu$ reads $$v_\mu=(\vec{x}_\mu;\{(\alpha_j^{(\mu)},c_j^{(\mu)})\}) \quad (12)$$

with j=0,1, ... ,($N_{edges}^\mu$-1). The resulting set of vertices is $$V=\{v_0, v_1, \ldots, v_{N-1}\}. \quad (13)$$

For simplification the index $\mu$ is dropped in the following equations, because they only refer to one single vertex, and thus a vertex simply reads $$v=(\vec{x};\{(\alpha_j,c_j)\}). \quad (14)$$

Figure 12A:
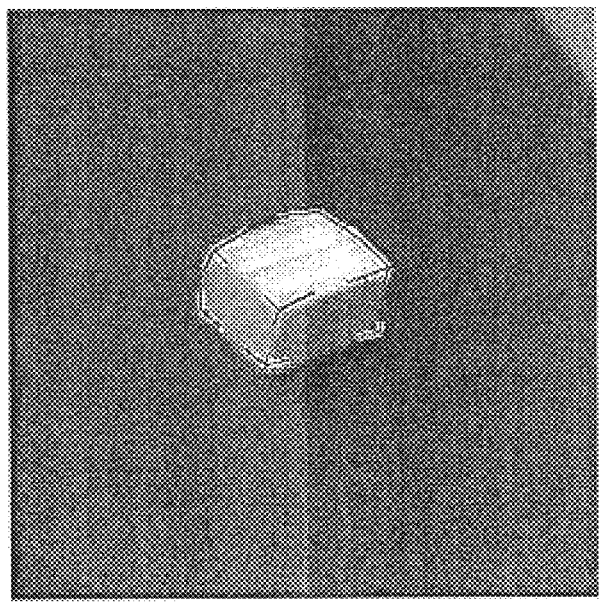
FIG. 12a is an image showing vertex detection and identification for a homogeneously illuminated wooden brick.
Figure 12B:
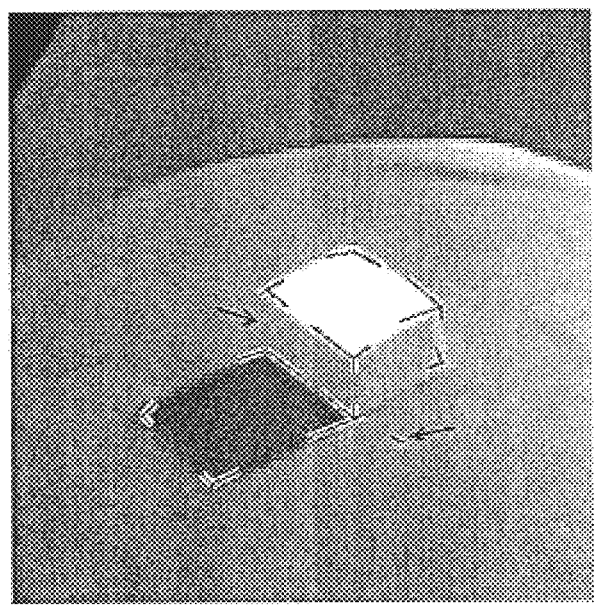
FIG. 12b is an image showing -vertex detection and identification for a wooden brick illuminated by a spot light.

FIGS. 12a–12c shows some examples of vertices detected and identified from images. The length of the lines indicates the confidence of the corresponding vertex edge. On a wooden brick illuminated by a spot light (FIG. 12b), the left vertical edge of the brick (see left arrow) has not been detected because the gray value of the background and that of the corresponding plane of the brick are equal. Also, an accidental vertex is detected (see right arrow).

The process of the invention is next directed to applying banana filters located on a surrounding circle: To determine the edges of a vertex, responses of uncurved banana filters (see eqn. (1)) or Gabor filters (which are a certain type of banana filters with c=0 and $\sigma_x=\sigma_y$ in eqn. (1)) in the region surrounding the detected location $\vec{x}$ are considered. Only the filters referring to one frequence level $f$ are taken into consideration. The responses are taken from a set of n points $\vec{p}_i$ located on the arc of a circle of radius r centered at $\vec{x}$ $$\vec{p}_i = \vec{x} + r\begin{pmatrix}\cos\phi_i\\\sin\phi_i\end{pmatrix} \text{ with } \phi_i = 2\pi\frac{i}{n}, \quad i \in \{0, 1, \ldots, n-1\} \quad (15)$$

The angle $\phi_i$ determines the banana filter taken at point $\vec{p}_i$ in the following way: the orientation of the frequency of the filter is $\phi_i\pi/2$ or, if not available in the applied set of filters, that direction which is closest to it. The response of the filters corresponding to the points are computed and the magnitudes $m'_i$ of the complex-valued filter responses are compiled in a vector $$\vec{m}=(m'_0, m'_1, \ldots, m'_{n-1})^T \quad (16)$$

The coefficients in the vector $\vec{m}'$ of the filter responses are smoothed by a Gaussian defined by $$g_j = \frac{1}{\beta_g}\exp\left(-\frac{(j-n/2)^2}{2\sigma_{smooth}^2}\right) \quad (17)$$

where $\beta_g$ is chosen such that $\Sigma_{j=0}^{n-1}g_j=1$. The smoothed vector coefficients $m_i$ are computed by $$\vec{c} \quad (18)$$

where mod means modulo.

Since the vector $\vec{m}$ refers to a circular arc the vector is treated under wrap around condition in the following computations (i.e., $m_n$ equals $m_o$, $m_n$, equals $m_o$, etc., and $m_{-1}$ equals $m_{n-1}$, etc.).

The next step for estimating an edge direction is to find local maxima in $\vec{m}$. The resulting set of indices of local maxima is $$L=\{i|m_i,m_{i-q}\wedge m_i>m_{i+q}\wedge m_i\geq\Theta_{edge} \forall i\in\{0,\ldots,n-1\} \quad (19)$$

with $q \in \{1,2, \ldots, n/2\}$. Those local maxima which are lower than the threshold $\Theta_{edge}$ are dropped. The angle $\phi_i$ corresponding to a local maximum is interpreted as the direction $\alpha$ of an edge and the value $m_i$ as the confidence c, thus the considered vertex is identified as $$v=(\vec{x};\{(\phi_i, m_i)|i \in L\}) \quad (20)$$

at this stage of processing.

The precision of the direction of every edge can be increased by considering the magnitudes of those directions which are near to the direction $\phi_i$ of the local maximum. Thereby that index $i_-$ with $i_-<i$ is determined which is closest to i and whose value $m_{i_-}$ fulfills $m_{i_-}<(1-\lambda)m_i$ with a small value $\lambda>0$ (e.g., $\lambda=0.1$). The same procedure is done for $i_+$ with $i_+>i$. The resulting values $i_-$ and $i_+$ allow to compute a second estimate of the direction of the vertex edge: $(\phi_{i_-}+\phi_{i_+})/2$. This procedure can be done for several values $\lambda_l(l \in\{0,1, \ldots, n_\lambda-1\})$, so that the resulting direction of the vertex edge is computable by:

$$\alpha_k = \frac{1}{n_\lambda+1}\left(\phi_i + \sum_{l=0}^{n_\lambda-1}\frac{\phi_{l,i-}+\phi_{l,i+}}{2}\right). \quad (21)$$

Such an improved angle $\alpha_i$ is computed for every $i \in L$ So that the vertex is identified as $$v=(\vec{x};\{(\alpha_i,m_i)|i\in L\}) \quad (22)$$

at this stage of processing.

The estimation of edges may be improved by considering the surrounding of a vertex. The identification of the edges of a vertex can be improved (a) by considering several circles with different radii $r_l$ instead of only one, (b) by considering different frequency levels of banana filters at one circle, or (c) by a combination of both variations (a) and (b). One certain choice of radii $r_l$ and frequency levels $k_l$ is to adapt the radius to the size of the banana filters in a way which can be described as "the smaller the filter the smaller the radius":

$$f_{l=f_{m\gamma\lambda}}\cdot f_s^l \quad (23)$$

$$r_l=\mu 1/f_l, \mu>0. \quad (24)$$

For every combination l ($l \in\{0,1, \ldots, N_l-1\}$) of the frequency $f_l$ and the radius $r_l$, there exists a resulting vertex description $$v^{(l)}=(\vec{x}; \{(\alpha_i^{(l)},m_i^{(l)})|i \in L_{(L)}\}). \quad (25)$$

To restrict to salient edges and to get rid of possible edges referring to noise, only those edges are considered which have at least $N_{neighbour}$ neighbours at other combinations l. Two edges are considered as neighbours if they have similar angles. The estimation of the angle of an edge is improved by computing the mean angle of all neighbours. The confidence is also improved by computing the mean value.

The formal description is based on the distance $f_{|\Delta|}(\alpha, \beta)$ between two angles. $f_{|\Delta|}(\alpha, \beta)$ is defined such that it takes the one-dimensional circular space of angles into consideration (e.g., the distance of the angles $0.1 \cdot 2\pi$ and $0.9 \cdot 2\pi$ will be $0.2 \cdot 2\pi$ and not $0.8 \cdot 2\pi$):

$$f\Delta(\alpha, \beta) = \begin{cases} \alpha - \beta & \text{if } -\pi < \alpha - \beta \leq \pi \\ \alpha - \beta - 2\pi & \text{if } \pi < \alpha - \beta \\ \alpha - \beta + 2\pi & \text{if } \alpha - \beta \leq -\pi \end{cases} \quad (26)$$

$$f_{|\Delta|}(\alpha, \beta) = \min\{|f_\Delta(\alpha, \beta)|, |f_\Delta(\beta, \alpha)|\}. \quad (27)$$

The set of neighbours of $\epsilon_i^{(l)}$ of the edge $(\alpha_i^{(l)}, m_i^{(l)})$ is determined by $$\epsilon_i^{(l)} = \{(\alpha_{i'}^{(l')}, m_{i'}^{(l')}) | f_{|\Delta|}(\alpha_{i'}^{(l')}, \alpha_i^{(l)}) < \Theta_{\Delta\alpha} \forall t' \neq l\} \forall i' \in L^{(l')} \quad (28)$$

with $\Theta_{\Delta\alpha} \in [0, \pi]$. A corresponding mean edge $(\overline{\alpha}_i^{(l)}, \overline{m}_i^{(l)})$ is computed from the considered edge and its neighbours by $$\overline{\alpha}_i^{(l)} = \alpha_i^{(l)} + \frac{1}{|\epsilon_i^{(l)}|+1} \cdot \sum_{(\alpha',m') \in \epsilon_i^{(l)}} f\Delta(\alpha_i^{(l)}, \alpha') \quad (29)$$

$$\overline{m}_i^{(l)} + \frac{1}{|\epsilon_i^{(l)}|+1}\left(m_i^{(l)} + \sum_{(\alpha',m') \in \epsilon_i^{(l)}} m'\right) \quad (30)$$

where $|\epsilon_i^{(l)}|$ is the number of neighbours.

The set of improved edges $\epsilon'$ only contains those edges, as already mentioned, which have at least $N_{neighbour}$ neighbours at other combinations l $$\epsilon' = \{(\overline{\alpha}^{(l)}, \overline{m}_i^{(l)}) | |\epsilon_1^{(l)}| \geq N_{neighbour} \forall l \in \{0, \ldots, N_1-1\} \forall i \in L^{(l)}. \quad (31)$$

This set is likely to contain edges which are quite similar or even identical to another edge of this set because every combination l contributes edges to the set. Thus, in a last step, the final set $\epsilon$ of improved edges is computed from $\epsilon'$ by copying one edge after the other from $\epsilon'$ to $\epsilon$ and dropping all those edges whose angle has a smaller distance than $\Theta_{\Delta\alpha}$ to the angle of an edge which has already been copied. (The distance is, of course, measured by $f_{|\Delta|}$.)

Thus the resulting identification of a vertex reads $$v = (\vec{x}; \epsilon) \quad (32)$$

A typical choice of all the parameters needed for the extraction of vertices is the following one: The banana trafo is $$n_f = 4 \quad (33)$$

$$n_o = 16 \quad (34)$$

$$n_b = 1 \quad (35)$$

$$n_e = 1 \quad (36)$$

$$f_{max} = \pi/2 \quad (37)$$

$$f_s = \pi/4 \quad (38)$$

$$\sigma_x = 2 \quad (39)$$

$$\sigma_y = 2 \quad (40)$$

$$\quad (41)$$

and all the other parameters are $$n = 100 \quad (42)$$

$$\sigma_{smooth} = n \cdot \frac{5}{360} \quad (43)$$

$$q = 3 \quad (44)$$

$$\Theta_{edge} = 0.05 \quad (45)$$

$$n_\lambda = 3 \quad (46)$$

$$\lambda_0 = 0.1 \quad (47)$$

$$\lambda_1 = 0.2 \quad (48)$$

$$\lambda_2 = 0.3 \quad (49)$$

$$\mu = 2.5 \quad (50)$$

$$\Theta_{\Delta\alpha} = 0.35 \quad (51)$$

$$N_{neighbour} = 1 \quad (52)$$

The advantage of this special feature type, the 2-dimensional shape primitives, is that its features do not appear at all pixels in the image but rather at insular and significant locations. This makes possible to learn a representation of an object in "one shot" without specifying the locations by hand as it is needed, for instance, in the approaches presented in Martin Lades, Jan C. Vorbrüggen, Joachim Buhmann, Jörg Lange, Christoph v.d. Malsburg, Rolf P. Würtz, and Wolfgang Konen, "Distortion invariant object recognition in the dynamic link architecture", *IEEE Trans. Comput*, 42(3):300 311, 1993., and Laurenz Wiskott, Jean-Marc Fellous, Norbert Krüger, and Christoph von der Malsburg, "Face recognition by elastic bunch graph matching", *IEEE-PA MI*, 19(7):775-779, 1997. To avoid unwanted features in the representation homogenous background and illumination is advisable. For the creation of a representation of an object in front of a structured background and under more extreme illuminations an iterative learning algorithm is given in the next section.

One-shot learning of an object representation is based on the set of extracted features; U for local line segments and V for vertices (see eqns. (6) and (13), respectively). To create an object representation, this set is represented by a graph. This allows to apply elastic graph matching for object recognition (described below). The nodes of the graph are labeled with the features and the edges of the graph are labeled with distance vectors to store the spatial distance between the nodes.

There exist two ways to create a graph from the set of features: First, a graph is created in the way that for every feature in the set a separate node is used, so that every node is labeled with only one feature. To create the edges of the graph, the nodes are located in a two dimensional space at the positions given by the features labeled at the nodes. Now, edges are created either as a minimum spanning tree or as a triangulation. Every resulting edge is labeled with a distance vector computed from the positions of the two nodes the edge in question connects.

Second, a rectangular grid is taken as graph. This grid is of same size as the considered image. It is located on the image whereby every node refers to a certain pixel position. A node of this graph is labeled with all those features the locations of which are closest to this node and not to another one. Thus a node can contain more than one feature, or also no feature.

In case there exists information about the position and size of the object within the image only those features are taken which refer to the given region, and if a grid graphs is used it is restricted to this region (see FIGS. 13a and 13b).

If local line segments and vertices are used simultaneously the resulting graph contains nodes labeled with local line segments, nodes labels with vertices, and also nodes labeled with both types of features.

A typical parameter choice of the distance of adjacent nodes in a grid graph is 11 pixels.

Iterative learning of an object representation may use a feature-independent description. A representation learned by one-shot learning may contain features belonging to the background or to shades caused by the illumination. To get rid of these features the reliability of the features can be determinated in a sequence of images. Furthermore, features which are missing in the representation, because of, for instance, abnormal lighting conditions, can be added during the processing of the sequence (see FIG. 12b). The following algorithm shows how a reliable object representation can be learned step-by-step on the condition that the object remains at the same location in the sequence and that the background and the illumination varies.

The representation consists of a set of features $A_i$ and a confidence value $c_i$ for every feature. Every feature-confidence unit $(A_i, c_i)$ is considered as a candidate for the resulting representation.

Conditions on the type of feature applied for learning are now defined. For the type of feature applied in this learning process two functions must be defined, 1. a distance function $d(a,b) \geq 0$, which measures the distance between the two features a and b (identical features lead to the value 0), and 2. an adaptation function $a' = f_{adapt}(a; b, r)$. Its resulting feature a' is the feature a adapted to the second feature b. The extent of the adaptation is given by the value $r \in [0; 1]$. This function has to be defined in a way that r=0 leads to a'=a and r=1 leads to a'=b and the values in between allow for a steady transition from a to b.

Since only these functions are required, the following interactive learning process is described feature-independent and can be used for all types of features for which these two functions are defined.

A description of the iterative learning process is as follows. Assume that a set of candidates $(A_i(t),c_i(t))$ is given at the time step t in the sequence (at the beginning, i.e., for t=0, this set is empty). First, the features $a_j(t)$ of the current image are computed. Second, for every candidate $A_i$ the closest input feature $a_j$ is determined by the help of the distance function d. Every input feature can only belong to one candidate. (In the case of equal distance to more than one candidate, one of these candidates is chosen at random.) A closed input feature is considered as similar to the corresponding candidate if the distance is smaller than the threshold $\Theta_d(t)$. Third, the following steps are applied to modify the candidates and their confidences according to the current input features:

1. Those candidates which are similar to an input feature are strengthened, i.e., their confidence is increased. Furthermore, the candidate is adapted towards the input feature to a certain extend.

$$r=f_{strengthen}(t,c_i(t)) \tag{53}$$

$$A_i(t+1)=f_{adapt}(A_i(t);a_j(t),r) \tag{54}$$

$$c_i(t+1)=(1-\epsilon_{up}(t, c_i(t)))\cdot c_i(t)+\epsilon_{up}(t, c_i(t))\cdot c_{max} \tag{55}$$

2. Candidates for which no similar input feature is present are weakened, i.e., their confidence is decreased.

$$c_i(t+1)=(1-\epsilon_{down}(t, c_i(t)))\cdot c_i(t) \tag{56}$$

3. All candidates $(A_i, c_i)$ the confidence of which are too low are removed.

$$c_i(t)<c_{min}(t) \tag{57}$$

4. The set of candidates is enlarged by those input features which are not similar to a candidate. Their confidence is set to an initial value $c_{init}(t)$. This implies that at the beginning of the iterative learning procedure all input features become a candidate.

5. If two candidates $A_i$ and $A_j$ are similar, i.e., their confidences fulfill $$d(c_i,c_j)<\Theta_d(t); \tag{58}$$

these candidates are fused ($A_i$ is modified and $A_j$ is removed):

$$r=f_{fuse}^{(1)}(t,c_i(t),c_j(t)) \tag{59}$$

$$A_i(t+1)=f_{adapt}(A_i(t); A_j(t),r) \tag{60}$$

$$c_i(t+1)=f_{fuse}^{(2)}(c_i(t),c_j(t)) \tag{61}$$

All these steps are applied at every time step t.

An object representation R can be determined and extracted at any point of time in the sequence and, of course, also at the end of the sequence. It is the set of those candidates the confidences of which are higher than a given threshold $C_{reliable}(t) \in [C_{min}(t), C_{max}]$ $$R=\{(A_j,c_j)\in A | c_j > c_{reliable}(t)\} \tag{62}$$

where A is the set of all candidates ($A=\{(A_i,c_i)\}$).

The following definition of function $f_{strengthen}(t,c_i(t))$ lets a candidate be more and more inert with increasing confidence $$f_{strengthen}(t, c_i(t)) = \frac{c_{init}(t)}{c_{init}(t) + c_i(t)}. \tag{63}$$

The following definition of function $f_{fuse}^{(1)}{}_{fuse}(t, c_i(t), c_j(t))$ leads to a fusion of the candidates i and j in which their confidences are considered as weights $$f_{fuse}^{(1)}(t, c_i(t), c_j(t)) = \frac{c_j(t)}{c_j(t) + c_i(t)} \tag{64}$$

The following definition of function $f^{(2)}(t,c_i(t),c_j(t))$ chooses the maximum value of both confidences given $$f_{fuse}^{(2)}(c_i(t),c_j(t))=\max\{c_i(t)c_j(t)\} \tag{65}$$

The simplest reasonable definition of the other functions are constant values:

$$c_{init}(t)=c_{init} \tag{66}$$

$$c_{min}(t)=c_{min} \tag{67}$$

$$c_{reliable}(t)=c_{reliable} \tag{68}$$

$$\epsilon_{up}(t,c_i(t))=\epsilon_{up} \tag{69}$$

$$\epsilon_{down}(t,c_i(t))=\epsilon_{down} \tag{70}$$

$$\Theta_d(t)=\Theta_d \tag{71}$$

A typical choice of all the parameters needed for the iterative learning based on the functions given in equations (63)–(71) is the following one:

$$c_{init}=0.1 \qquad (72)$$

$$c_{min}=0.099 \qquad (73)$$

$$c_{reliable}=0.3 \qquad (74)$$

$$\epsilon_{up}=0.04 \qquad (75)$$

$$\epsilon_{down}=0.01 \qquad (76)$$

$$\Theta_d=0.3 \qquad (77)$$

Definition of the distance and adaptation function for local line segments is now defined. For the feature type local line segment the distance function is defined in two steps. First a distance measure is defined for the orientation-curvature subspace $(\alpha, c)$ expressing the Moebius topology thereof. Let $(e_x, e_y, e_f, e_\alpha, e_c, e_s)$ define a cube of volume I in the feature space, i.e., the distance function is defined such that the vector $(e_x, e_y, e_f, e_\alpha, e_c, e_s)$ has norm 1. The distance measure for this subspace reads $$d((\alpha_1, c_1), (\alpha_2, c_2)) = \qquad (78)$$

$$\min\left\{\sqrt{\frac{(\alpha_1-\alpha_2)^2}{e_\alpha^2}+\frac{(c_1-c_2)^2}{e_c^2}}, \sqrt{\frac{((\alpha_1-\pi)-\alpha_2)^2}{e_\alpha^2}+\frac{(c_1+c_2)^2}{e_c^2}}, \right.$$

$$\left. \sqrt{\frac{((\alpha_1+\pi)-\alpha_2)^2}{e_\alpha^2}+\frac{(c_1+c_2)^2}{e_c^2}} \right\}.$$

Secondly, a distance measure on the complete coordinate space is defined by $$d(\vec{c}_1, \vec{c}_2) = \left(\frac{(x_1-x_2)^2}{e_x^2}+\frac{(y_1-y_2)^2}{e_y^2}+\right. \qquad (79)$$

$$\left.\frac{(f_1-f_2)^2}{e_f^2}+d((\alpha_1,c_1),(\alpha_2,c_2))^2+\frac{(s_1-s_2)^2}{e_s^2}\right)^{1/2}.$$

The parameter $(e_x, e_y, e_f, e_\alpha, e_c, e_s)$ determines the distances in each one-dimensional subspace. A smaller value indicates a stretching of this space.

The adaptation function is defined by $$f_{adapt}(a;b,r) = \begin{pmatrix} x_a \\ y_a \\ f_a \\ \alpha_a \\ c_a \\ s_a \end{pmatrix} + \begin{pmatrix} x_b - x_a \\ y_b - y_a \\ f_b - f_a \\ (\alpha_b - \alpha_a) \bmod \pi \\ c_b - c_a \\ s_b - s_a \end{pmatrix} \qquad (80)$$

where a and b are two features and $r \in [0;1]$.

A typical choice of all the parameters needed for the distance and adaptation function is given in the third column of table 1.

The distance and adaptation function for the vertices is now defined. The distance function first finds out which edge of the first vertex belongs to which edge of the second one (every edge can only be 'used' once). Based on these pairs of edges and, if there exist some, based on those edges which do not belong to edge-pairs the distance value is computed in the following way: the more similar the directions of the edge-pairs are and the more similar their confidences are the smaller the value of the distance function will be. Edges which do not belong to edge-pairs increase the resulting value.

The distance function of two vertices is based on the distance $f_{|\Delta|}(\alpha, \beta)$ between two angles which has been defined in eqn. (27). The first step is to find out which edges of the two considered vertices $v^{(1)}$ and $v^{(2)}$ belong to each other. Let these two vertices be given as $$v^{(1)}=\{\vec{x}^{(1)};\epsilon^{(1)}\} \text{ with } \epsilon^{(1)}=\{(\alpha_i^{(1)},c_i^{(1)})\} \qquad (81)$$

$$v^{(2)}=\{\vec{x}^{(2)};\epsilon^{(2)}\} \text{ with } \epsilon^{(2)}=\{(\alpha_i^{(2)},c_i^{(2)})\} \qquad (82)$$

where $\epsilon^{(1)}$ is the set of edges, described by angle-confidence pairs, of the first vertex; $|\epsilon^{(1)}|$ gives the number of edge-pairs in this set (analog for $\epsilon^{(2)}$ which refers to the second vertex). These sets may contain a different number of entries. To determine which edge of $v^{(1)}$ belongs to which edge in $v^{(2)}$ the following procedure is applied: The first edge-pair consists of those two edges which are closest to each other. The second edge-pair is determined in the same way, however, the edges which already belong to the first edge-pair are ignored now. Continue this way until either the first or the second vertex does not contain an 'unused' edge any more. The following algorithm shows this procedure more formally. ('Ø' means an empty set, ':=' means assignment, 'angle(e)' gives the edge direction $\alpha$ of the edge $e=(\alpha,c)$, and 'A\B' means set A without the elements of set B.)

$\hat{\epsilon}^{(1)}:=\emptyset$ $\hat{\epsilon}^{(2)}:=\emptyset$ $\hat{P}:=\emptyset$ while $(\epsilon^{(1)}\backslash\hat{\epsilon}^{(1)}\neq\emptyset \wedge \epsilon^{(2)}\backslash\hat{\epsilon}^{(2)}\neq\emptyset)$ begin $(e,e'):=\arg\min\{f_{|\Delta|}(angle(e), angle(e'))\}$ $e\in\epsilon^{(1)}\backslash\hat{\epsilon}^{(1)}, e'\in\epsilon^{(2)}\backslash\hat{\epsilon}^{(2)}$ $P:=P\cup\{(e,e')\}$ $\hat{\epsilon}^{(1)}:=\hat{\epsilon}^{(1)}\cup\{e\}$ $\hat{\epsilon}^{(2)}:=\hat{\epsilon}^{(2)}\cup\{e'\}$ end $N^{(1)}:=(\epsilon^{(1)}\backslash\hat{\epsilon}^{(1)})$ $N^{(2)}:=(\epsilon^{(2)}\backslash\hat{\epsilon}^{(2)})$ The results of the procedure are the three sets P, $N^{(1)}$ and $N^{(2)}$. P contains all the edge-pairs of the two vertices, $N^{(1)}$ and $N^{(2)}$, all those edges of the first and second vertex which have not been used for the edge-pairs, respectively. Of course, either $N^{(1)}$ or $N^{(2)}$ is empty.

Based on these two sets the distance function for two vertices is defined as $$d(v^{(1)},v^{(2)})=1-s_{edge}(v^{(1)},v^{(2)})\cdot s_{location}(v^{(1)},v^{(2)}) \qquad (83)$$

with the similarity $s_{edge}$ between the edges and the similarity of $s_{location}$ of the locations $$s_{edge}(v^{(1)}, v^{(2)}) = \exp\left(-\frac{<\Delta\alpha>^2}{2\lambda_1^2} - \frac{<\Delta c>^2}{2\lambda_2^2}\right) \cdot \exp\left(-\frac{<c>^2}{2\lambda_3^2}\right) \quad (84)$$

$$s_{location}(v^{(1)}, v^{(2)}) = \exp\left(-\frac{(\vec{x}^{(1)} - \vec{x}^{(2)})^2}{2\lambda_4^2}\right) \quad (85)$$

applying the quantities $$<\Delta\alpha>^2 = \frac{1}{|P|} \sum_{(e,e') \in P} (f_\Delta(angle(e), angle(e')))^2 \quad (86)$$

$$<\Delta c>^2 = \frac{1}{|P|} \sum_{(e,e') \in P} (conf(e), conf(e'))^2 \quad (87)$$

$$<c>^2 = \frac{1}{|N^{(1)} \cup N^{(2)}|} \sum_{e \in N^{(1)} \cup N^{(2)}} (conf(e))^2 \quad (88)$$

where '|A|' means the number of elements in set A and 'angle(e)' and 'conf(e)' give the direction α and the confidence c of the edge e=(α,c), respectively.

The definition of the adaptation function is based on the two sets P and $N^{(1)}$ introduced above. The adaptation consists of two different cases: (1) the edges of $v^{(1)}$ which belong to an edge-pair are adapted to the corresponding edge of $v^{(2)}$, (2) the other edges in $v^{(1)}$ (given in $N^{(1)}$) get their confidences reduced. The location $\vec{x}^{(1)}$ of $v^{(1)}$ is adapted to the location of the other vertex in a linear way.

$$f_{adapt}(v^{(1)}; v^{(2)}, r) = (\vec{x}'; E') \quad (89)$$

with $$\vec{x}' = \vec{x}^{(1)} + r(\vec{x}^{(2)} - \vec{x}^{(1)}) \quad (90)$$

$$A = \{(\alpha + r \cdot f_\Delta(\alpha', \alpha), c + r(c' - c))| \quad (91)$$

$$\forall ((\alpha, c), (\alpha', c')) \in P\} \quad (92)$$

$$B = \{(\alpha, (1-r) \cdot c) | \forall (\alpha, c) \in N^{(1)})\} \quad (93)$$

(no equation) (94)

$$E' = A \cup B \quad (95)$$

A typical choice of all the parameters needed for the distance and adaptation function is the following one:

$$\lambda_1 = 0.35 \quad (96)$$

$$\lambda_2 = 1 \quad (97)$$

$$\lambda_3 = 50 \quad (98)$$

$$\lambda_4 = 10000 \quad (99)$$

The object representations extracted from one image by one shot learning or from an image sequence by iterative learning can be used for object recognition. The object coded by a graph G labeled with local line segments, vertices or both can be recognized in an unknown image I by using elastic graph matching (EGM) (see, Martin Lades, Jan C. Vorbrüggen, Joachim Buhmann, Jörg Lange, Christoph v.d. Malsburg, Rolf P. Würtz, and Wolfgang Konen. Distortion invariant object recognition in the dynamic link architecture. *IEEE Trans. Comput.*, 42(3):300 311, 1993. The only formula which has to be defined to apply EGM to the two feature types local line segments or vertices is the similarity function $S(G_k, a(\vec{x}))$ which compares the data given at the k-th node $G_k$ of the graph with the data $a(\vec{x})$ extracted from the image I at the location $\vec{x} = (x, y)$. Furthermore, it is specified for the two feature types how the needed data $a(\vec{x})$ is extracted from the image.

Elastic graph matching may be accomplished using local line segments. Using local line segments as feature the similarity function $S(G_k, a(\vec{x}))$ is the average of the normalized filter responses corresponding to the node $G_k$ (i.e., $\vec{c}_i = (x_i, y_i, f_i, \alpha_i, c_i, s_i) \in G_k$) in the image at the pixel position (x, y):

$$a(\vec{x}) = \{r(x', y', f, \alpha, c, s)| \text{ all } x', y', f, \alpha, c, s \text{ in a local area with center } (x,y)\} \quad (100)$$

$$S(G_k, a(\vec{x})) = \frac{1}{|G_k|} \sum_{\vec{c}_i \in Gk} N(r(x - x_i, y - y_i, f_i, \alpha_i, c_i, s_i); \vec{x}, f_i), \quad (101)$$

where $|G_k|$ is the number of local line segments the k-th node is labeled with. The local area applied in the computation of $a(\vec{x})$ is a square with the edge length $2*\max\{|x_i|, |y_i|\}+1$.

Elastic graph matching may be accomplished using vertices. The preprocessed image data $a(\vec{x})$ is the vertex extracted as described in section 3.2. Thus $a(\vec{x})$ is represented as in eqn. (14)

$$a(\vec{x}) = (\vec{x}; \{(\alpha_j, c_j)\}). \quad (102)$$

Since the node $G_k$ as well as the data $a(\vec{x})$ extracted from the image contain a vertex, two vertices have to be compared by the similarity function. The similarity function $s_{edge}(v^{(1)}, v^{(2)})$ defined in eqn. (84) is applied for this purpose $$S(G_k, a(\vec{x})) = s_{edge}(G_k, a(\vec{x})). \quad (103)$$

A typical choice of all the parameters concerning vertices for the similarity function eqn. (103) is $$\lambda_1 = 0.35 \quad (104)$$

$$\lambda_2 = 1 \quad (105)$$

$$\lambda_3 = 50 \quad (106)$$

Elastic Graph Matching may be accomplished using both local line segments and vertices. A graph may not only contain one type of feature but can rather contain local line segments as well as vertices. Both is possible within one graph, first, that a node contains both types of features or, second, that a node contains either type of feature. Depending on the type of feature attached to a node, the corresponding data $a(\vec{x})$ has to be extracted from the image and the corresponding similarity function $S(G_k, a(\vec{x}))$ has to be applied.

While the foregoing has been with reference to specific embodiments of the invention, it will be appreciated by those skilled in the art that these are illustrations only and that changes in these embodiments can be made without departing from the principles of the invention, the scope of which is defined by the appended claims.

We claim:

1. A method for extracting vertices from an image, comprising;
   - detecting vertices in the image resulting in corresponding vertex locations;
   - identifying the detected vertices by computing responses of banana filters located on a circle surrounding each vertex location, and by smoothing the banana filter responses associated with the vertices;
   - estimating directions of vertex edges for each identified vertex by finding local maxima of the smoothed banana filter responses improving the estimation of a particular edge direction by determining edge directions which are close to the particular estimated edge direction; and
   - calculating a mean edge direction based on the close estimated edge directions.

2. A method for extracting vertices from an image as defined in claim 1, further comprising improving the estimation of the edge directions by analyzing a portion of the image surrounding each vertex.

3. A method for extracting vertices from an image as defined in claim 1, wherein the vertices are extracted using one-shot learning to the extracted vertices in which the detecting, identifying, and estimating steps are performed on the image only once.

4. A method for extracting vertices from an image as defined in claim 1, wherein the banana filters comprise a set of generalized Gabor wavelet filters.

* * * * *